United States Patent
Bottomley et al.

(10) Patent No.: US 6,335,954 B1
(45) Date of Patent: *Jan. 1, 2002

(54) METHOD AND APPARATUS FOR JOINT SYNCHRONIZATION OF MULTIPLE RECEIVE CHANNELS

(75) Inventors: Gregory Edward Bottomley; Sandeep Chennakeshu, both of Cary, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,560

(22) Filed: Dec. 27, 1996

(51) Int. Cl.$^7$ ................................. H04L 7/00
(52) U.S. Cl. ................. 375/354; 375/267; 375/347; 375/350; 375/355
(58) Field of Search ................. 375/347, 267, 375/232, 324, 329, 349, 350, 355, 354; 370/342, 335, 347; 455/278.1, 137, 135, 296

(56) References Cited

U.S. PATENT DOCUMENTS

| 5,164,964 A | 11/1992 | Kubo | 375/100 |
| 5,351,274 A | 9/1994 | Chennakeshu et al. | 375/100 |
| 5,363,376 A | 11/1994 | Chuang et al. | 370/95.3 |

(List continued on next page.)

FOREIGN PATENT DOCUMENTS

| EP | 0544315 | 6/1993 | H03M/13/00 |
| EP | 0665665 | 8/1995 | H04L/7/04 |
| EP | 0669729 | 8/1995 | H04B/7/005 |
| EP | 0716513 | 6/1996 | H04B/7/08 |
| EP | 0735702 | 10/1996 | H04B/7/08 |
| EP | 716513 | * 12/1996 | H04B/7/08 |
| FR | 2735635 | 12/1996 | H04B/7/005 |
| WO | WO 96/07247 | 3/1996 | H04B/7/02 |

OTHER PUBLICATIONS

J.H. Winters, "Optimum Combining in Digital Mobile Radio with Co–Channel Interference," IEEE J. Sel. Areas Commun., vol. SAC–2, pp. 528–539, Jul. 1984.

(List continued on next page.)

Primary Examiner—Stephen Chin
Assistant Examiner—Shuwang Liu
(74) Attorney, Agent, or Firm—Coats & Bennett, P.L.L.C.

(57) ABSTRACT

An apparatus for joint synchronization of digital communication signals from multiple receive channels comprises a control unit, a metric computer, and a decimator. The control unit generates test sampling phase vectors for use in decimating the signals. The output of the decimator is used by the metric computer to form a metric predictive of the performance of a demodulator. The metric is used by the control unit to select an optimal sampling phase vector. In one embodiment, the metric computer calculates the signal to impairment plus noise ratio (SINR) at the output of the demodulator based on the decimated signals. In one embodiment, a data correlation estimator generates a data correlation estimate for use in calculating output SINR.

In another embodiment, the apparatus includes a select unit and a metric computer. The select unit may include a control unit and a decimator. The metric computer also includes at least one decimator. Test sampling phase vectors are provided to the metric computer along with the input signals. The metric computer generates a metric predictive of the performance of the interference canceling processor. The control unit selects a test sampling phase vector that optimizes performance of the interference canceling processor. The decimator decimates the input signals according to the sampling phases of the selected sampling phase vector.

A method of joint synchronization of signals from multiple receive channels is also disclosed.

73 Claims, 11 Drawing Sheets

U.S. PATENT DOCUMENTS

| | | | |
|---|---|---|---|
| 5,406,588 A | | 4/1995 | Birchler et al. ............. 375/346 |
| 5,406,593 A | | 4/1995 | Chennakeshu et al. ..... 375/120 |
| 5,481,572 A | * | 1/1996 | Skold et al. ................. 375/347 |
| 5,499,272 A | * | 3/1996 | Bottomley ................... 375/347 |
| 5,517,535 A | * | 5/1996 | Kroeger et al. ............. 375/373 |
| 5,636,208 A | * | 6/1997 | Chang et al. ................ 370/347 |
| 5,687,197 A | * | 11/1997 | Powell, III et al. ......... 375/347 |
| 5,838,742 A | * | 11/1998 | Abu-Dayya ................. 375/347 |
| 5,878,093 A | * | 3/1999 | Molnar et al. .............. 375/347 |

OTHER PUBLICATIONS

G.E. Bottomley and K. Jamal, "Adaptive Arrays and MLSE Equalization," Proc. IEEE Vehic. Technol. Conf., Jul. 1995.

D. Dlugos and R. Scholz, "Acquisition of Spread Spectrum Signals by an Adaptive Array," IEEE Trans. Acou. Speech Signal Processing, vol. 37, No. 8, pp. 1253–1270, Aug. 1989.

L. Brennan and I. Reed, "An Adaptive Array Signal Processing Algorithm for Communications," IEEE Trans. Aerosp. Elect. System, vol. 18., No. 1, pp. 124–130, Jan. 1982.

P. Chevalier et al., "Antennae Intelligent pour le Systeme GSM: Resultats Experimentaux Pour Une Reception Mobile," Proc. Conf. SEE sur l'Avenement des Communications Personelles, pp 145–156, Vanves (France) Jun. 1996—Note: Included is a copy of substantially the same paper in English: P. Chevalier et al., "Smart Antennas for the GSM System: Experimental Results for a Mobile Reception," Proc. IEEE Vehic. Technol. Conf., May 1997.

U.S. application No. 08/284,775, Bottomley, filed Aug. 2, 1994.

* cited by examiner

METHOD AND APPARATUS FOR JOINT SYNCHRONIZATION OF MULTIPLE RECEIVE CHANNELS

BACKGROUND OF THE INVENTION

1. Field of the Invention

The present invention relates generally to the communication of digital signals and more specifically to receiver synchronization of multiple diversity channels in a digital communication system.

2. Description of Related Art

In digital communication systems, digital symbols, such as binary ±1 values, are transmitted as waveforms through a channel from a transmitter to a receiver. The term "channel" is used here in a general sense, and refers to any medium through which signals are transmitted. For example, a channel may be a radio environment, a copper wire, an optical fiber, or a magnetic storage medium. In each case, the signal received at the receiver differs from the signal transmitted by the transmitter due to the effects of transmission through the channel. The received signal often includes noise and interference from other signals which diminish the quality of the signal and increase the probability of transmission errors.

In wireless communications systems in particular, a phenomenon known as Rayleigh fading may cause highly localized signal losses of 40 dB or more due primarily to signal path differences. In order to overcome Rayleigh fading, it is known to employ a plurality of antennas at the receiver in a technique known as spatial diversity. When the receiver antennas are physically separated by a sufficient distance, the signals received by the antennas exhibit uncorrelated Rayleigh fading. The signals received by the antennas are referred to as "diversity signals," and the antennas are referred to as "diversity antennas." The diversity signals are combined at the receiver to produce a more robust, intelligible signal.

Closely spaced antenna elements may also be used, as in a phased array, to provide array gain, even though diversity gain may be thereby reduced or eliminated. It may be preferable to apply beamforming to phased array signals prior to demodulation.

At the receiver, signal preprocessing operations such as filtering, amplification, and possibly mixing are performed on the signal prior to demodulation. The signal preprocessing operations may also include sampling and quantizing the received signal to obtain a sequence of received data samples. Following such signal pre-processing, the received signal is demodulated and converted to analog for output.

In most digital communication systems, synchronization (or "sync") signals sent by the transmitter assist the receiver in demodulating the received digital signals. The receiver compares the received signals with copies of the known sync signals to determine the bit or symbol timing, to determine frame timing, and possibly to estimate the channel response. The symbol timing indicates the best place to sample the received signal and the frame timing indicates where the start of a new frame occurs. If oversampling is performed, timing indicates which sampling phase to use when decimating the oversampled data.

With conventional synchronization methods, timing is determined by finding a sampling phase which maximizes the signal strength of the desired signal. Typically this is done by correlating the received signal to the sync signal and using magnitude squared correlation values as indications of signal strength.

Unfortunately, the received signal includes an impairment signal that prevents perfect recovery of the transmitted digital symbols. If the impairment is Additive White Gaussian Noise (AWGN), then the conventional strategy of maximizing signal strength described above also maximizes signal-to-noise ratio (SNR) at the input of the demodulator. If the impairment consists of other signals, such as co-channel interference or adjacent channel interference, then the input signal to impairment plus noise ratio (SINR) can be maximized according to the method discussed in U.S. Pat. No. 5,406,593 to Chennakeshu et al.

When multiple receive antennas are employed for spatial diversity, the conventional approach is to synchronize each diversity signal separately, as discussed in U.S. Pat. No. 5,406,593. This optimizes the SNR or SINR on each diversity channel. This approach makes sense with conventional diversity combining in which no interference cancellation is performed, as the demodulator output SINR is, at best, the sum of the SINRs of the different diversity channels. However, when interference cancellation is performed at the receiver, maximizing the SINR on each antenna is not necessarily the best strategy. Rather, it may be advantageous to coordinate the interfering signals on different antennas in time, so that the interference components of the various signals will cancel one another when the diversity signals are combined. This is something separate channel synchronization cannot guarantee. Thus, there is a need for a method and apparatus capable of jointly synchronizing multiple receive channels to maximize the performance of an interference canceling detector.

SUMMARY OF THE INVENTION

It is, accordingly, a primary object of the present invention to provide an apparatus for joint synchronization of multiple receive channels.

In accordance with the present invention, an apparatus for joint synchronization of multiple receive channels is provided. The apparatus includes means for receiving signals, means for preprocessing received signals, means for joint synchronization of the preprocessed signals, and means for canceling interference in the synchronized signals, wherein the data contents of the received signals are determined after cancellation of the interference.

A method of jointly synchronizing multiple receive signals is further provided. In accordance with the present invention, a sampling phase offset is selected for each diversity signal such that the SINR of the combined receive channels is maximized.

These and other objects of the invention, together with features and advantages thereof, will become apparent from the following detailed description when read with the accompanying drawings in which like reference numerals refer to like elements.

DETAILED DESCRIPTION OF THE PREFERRED EMBODIMENT

Figure 1:
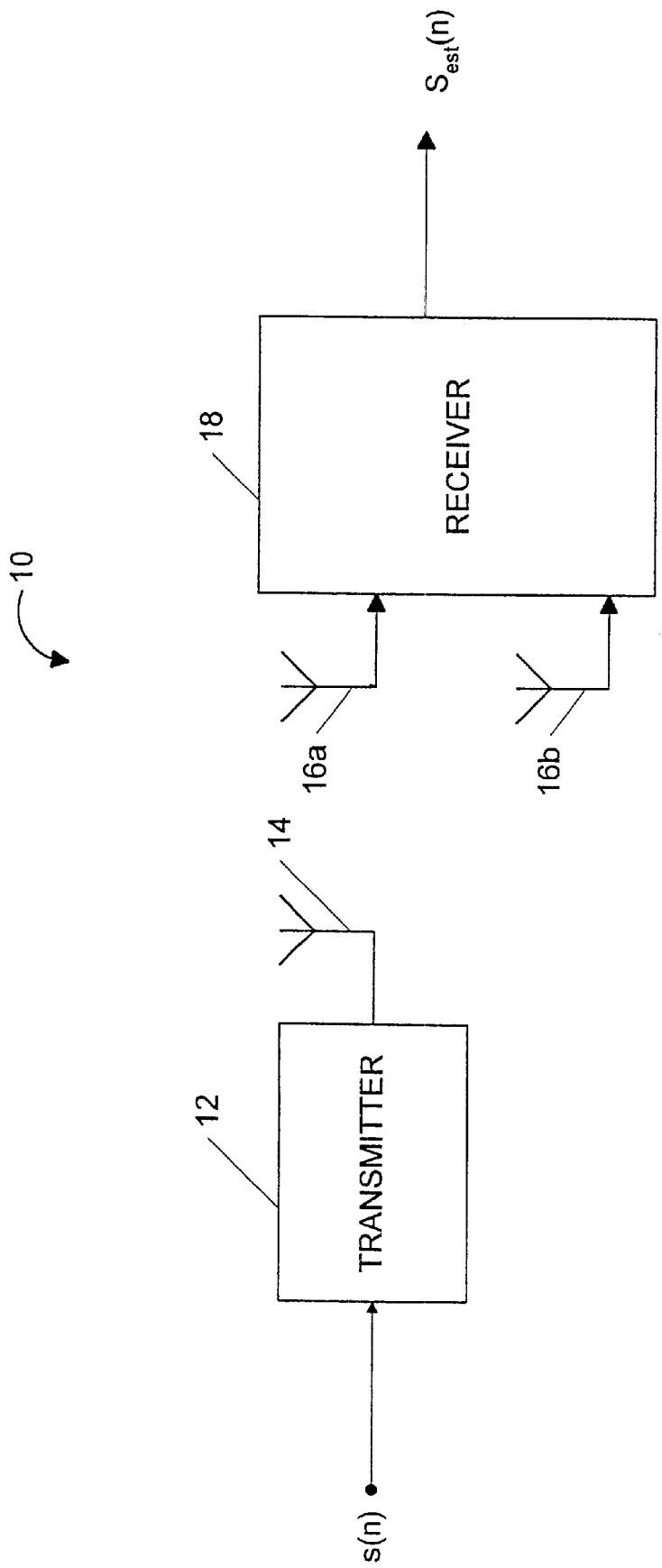
FIG. 1 is a block diagram of a typical digital communication system.

FIG. 1 illustrates a block diagram of a typical digital communication system 10 employing diversity antennas 16*a,b* wherein digital information symbols s(n) are transmitted as a digital communications signal by a transmitter 12 and a transmit antenna 14. The transmitted signal passes through a transmission medium and is received by receive antennas 16*a,b*. The receive antennas 16*a,b* provide the received diversity signals to a receiver 18 which detects the transmitted information symbols. Each diversity signal includes an impairment signal which consists of thermal noise and possibly interference signals. The presence of an impairment signal makes it difficult for the receiver to perfectly detect the information symbols.

Figure 2:
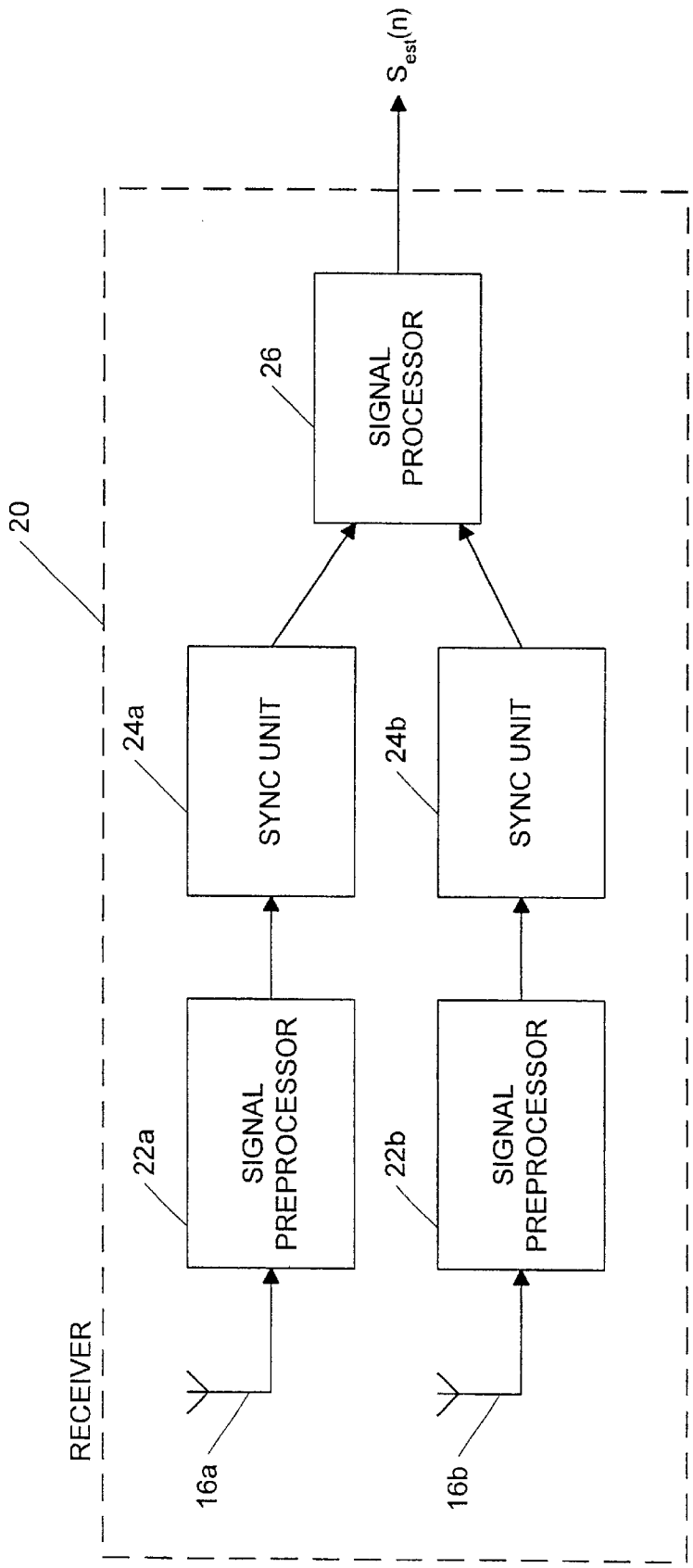
FIG. 2 is a block diagram of an apparatus for a separate channel synchronization in accordance with the prior art.

FIG. 2 illustrates a block diagram of a typical receiver architecture 20 with separate channel synchronization in accordance with prior art. The received signals are processed by signal preprocessors 22*a,b*, which typically filter, amplify, and mix the signals to baseband signals. Each baseband signal is processed by separate synchronizing means, such as sync units 24*a,b*, which apply conventional synchronization techniques to determine frame and sample timing. Each individually synchronized diversity signal is then provided to a signal processor 26, which detects the information symbols by analyzing the individually synchronized diversity signals. This is typically done by diversity combining the synchronized signals using well known techniques, such as maximal ratio combining, equal gain combining or selective combining.

In order to improve the accuracy of detection, the signal processor 26 may perform interference cancellation or some other form of demodulation. Interference cancellation techniques have been proposed for digital communication systems. See, for example, J. H. Winters, Optimum Combining in Digital Mobile Radio with Co-channel Interference, IEEE J. Sel. Areas Commun., vol. 2, pp. 528–539, July 1984 as well as G. E. Bottomley and K. Jamal, Adaptive Arrays and MLSE Equalization, Proc. IEEE Veh. Technol. Conf., Chicago, Jul. 25–28, 1995. The basic principle employed for interference cancellation is to combine signals from the different antennas so that the impairment signals are suppressed or canceled. Thus, the goal is to have the desired signal components from each antenna add constructively, while the interference components add destructively.

However, when interference cancellation is performed in the detector, it is no longer desirable for the sync operation, and in particular the selection of timing, to be designed solely to maximize the signal energy of the desired receive signal. For improved system performance, it is also desirable to reduce the amount of interference present in the received signal after combining the diversity signals. Conceptually, this is achieved by aligning or coordinating the interference components as well as the desired signal components of the diversity signals so that the interference components cancel one another out when combined.

Figure 3:
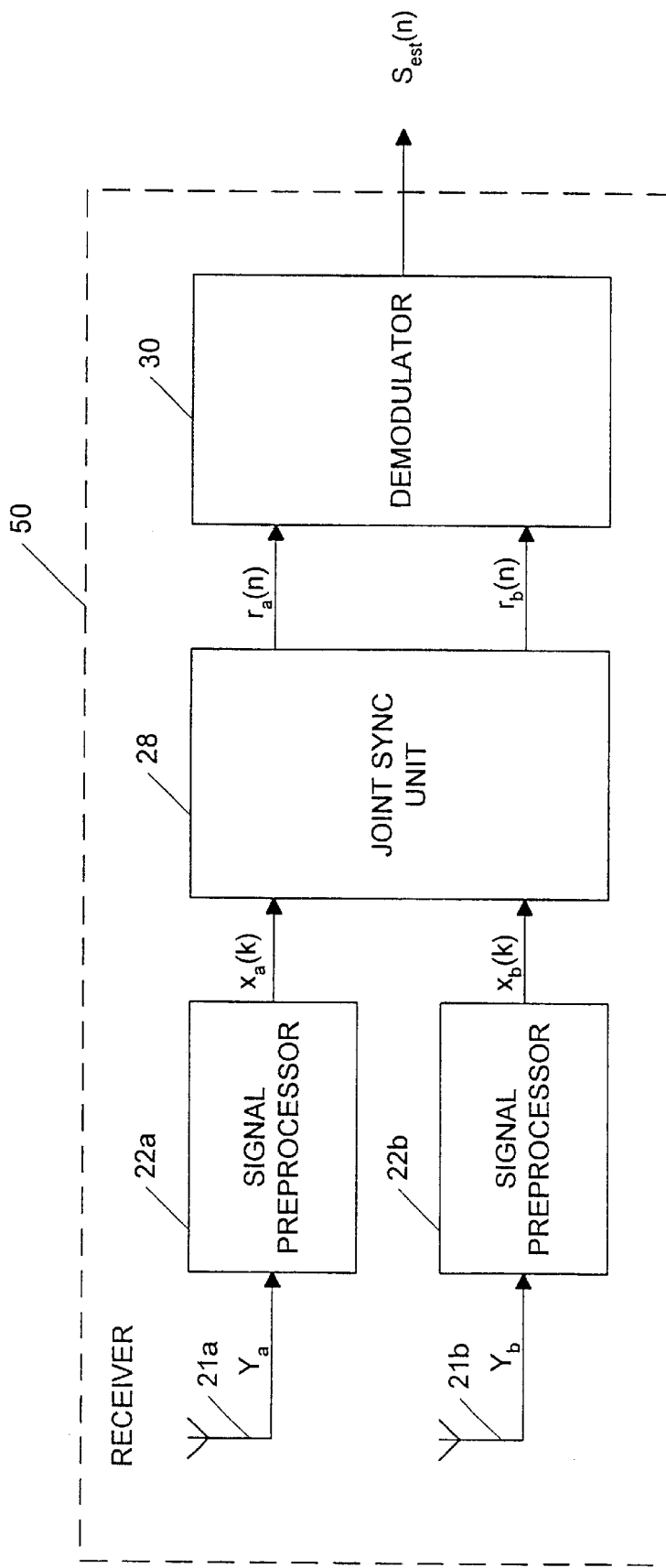
FIG. 3 is a block diagram of a receiver architecture in accordance with an embodiment of the present invention.

According to the present invention, coordination of the diversity signals is achieved by jointly synchronizing the plurality of diversity signals received at separate antennas. FIG. 3 is a block diagram of a receiver architecture in accordance with the present invention. For ease of reference, the present invention will be described with respect to a receiver having two diversity antennas. However, those skilled in the art will recognize that the present invention may be employed in a receiver having more than two diversity antennas, as well as other types of antennas.

In order to facilitate understanding of the present invention, the theory of joint synchronization will be described briefly. The transmitted digital communications signal is received by antennas 21*a,b* as diversity signals $Y_a$ and $Y_b$. Antennas 21*a,b* provide the diversity signals $Y_a$ and $Y_b$ to signal preprocessors 22*a* and 22*b,* respectively. The signal preprocessors 22*a,b* convert the received diversity signals $Y_a$ and $Y_b$ into discrete sample streams, denoted $x_a(k)$ and $x_b(k)$. The discrete sample streams $x_a(k)$ and $x_b(k)$ are then provided to joint sync unit 28, which jointly synchronizes the diversity signals by determining sample timing for each diversity signal. The resulting signals are provided to demodulator 30. In a preferred embodiment, demodulator 30 includes an interference canceling processor.

By taking each of the received signals into account in the synchronization process, the performance of the subsequent interference cancellation process may be optimized in the manner described below. Let x(k) denote the vector of received signal samples from signal preprocessors 22*a,b*, which sample the signal N times per information symbol period. Thus, in a receiver having two receive antennas, $$x(k) = \begin{bmatrix} x_a(k) \\ x_b(k) \end{bmatrix}$$

where each element in the vector corresponds to the signal received by a different receive antenna. The joint sync unit 28 produces a vector of received signal samples denoted r(n) sampled only M times per information symbol period, where M is typically 1 or 2. Each element $r_i(n)$ of r(n) is given as:

$$r_i(n) = x_i\left(n\frac{N}{M} + p_i\right) \quad [1]$$

where n is the sample index and $p_i$ is an integer value denoting the particular sampling phase selected by the joint sync unit 28 for signal $x_i(k)$. The process of generating $r_i(n)$ from $x_i(k)$ is known as decimation, and is performed by devices known as decimators, which accept $x_i(k)$ and a sampling phase $p_i$ as input.

The collection of sampling phases may be organized as sampling phase vector p. The joint sync unit 28 selects a set of sampling phases $p_i$ that results in a maximized value of the SINR of the combined signal output by the demodulator 30. The joint sync unit selects one sampling phase per antenna, so that only M out of N samples are kept for processing per symbol period. The receiver is sometimes referred to as being symbol-spaced (M=1) or fractionally spaced (M>1), depending on the choice of M.

By selecting an appropriate sampling phase vector, the output SINR is maximized in the following manner, in which M=1 (i.e. only one sample per period is selected for processing). Taking the array processing method presented in Winters, supra, and omitting the discrete sample index n for simplicity, the vector of received samples r, after synchronization and sampling, can be represented as:

$$r = cs + z \quad [2]$$

where c is a vector of channel taps, one per antenna, s is the transmitted data symbol to be detected, and z is a vector of impairment values, one per antenna. The impairment can include both thermal noise and interference from other communication signals.

To reject both noise and interference, the demodulator 30 combines the samples r into a detection statistic $y_d$ which is used to identify the transmitted information symbol s. Of all possible information symbols, the transmitted information signal is determined to be the one closest to the detection statistic. In the preferred embodiment, the detection statistic $y_d$ is calculated as a weighted average of all received signals. It can be represented by the following equation:

$$y_d = w^H r \quad [3]$$

where the superscript H denotes the conjugate transpose of weighting vector w. According to Winters, supra, an optimal choice for the weights is given by:

$$w = R^{-1}_{zz} c \quad [4]$$

where $R_{zz} = E\{z\, z^H\}$ is the expected value of the correlation matrix associated with the impairment across the receive antennas 21a,b. For a system having D receive antennas, $R_{zz}$ comprises a matrix having dimensions D×D. $E\{x\}$ denotes expected value of x. The zz subscript indicates that R is obtained by correlating the impairment vector z with itself (z). In practice, the channel taps c and the impairment correlation matrix $R^{-1}_{zz}$ can be estimated from the received signal using conventional methods. An example of such estimation is given in U.S. application Ser. No. 08/284,775, which is incorporated herein by reference.

Theoretically, the output SINR using this technique is given in Winters, supra, by the following equation:

$$SINR = c^H R^{-1}_{zz} c \quad [5]$$

However, the values for the channel taps and the impairment correlation matrix will depend on the sync or timing used, which is denoted by the sampling phase vector p. Thus, in general, the output SINR is given by:

$$SINR(p) = c^H(p) R^{-1}_{zz}(p) c(p) \quad [6]$$

From equation 6 it is observed that the output SINR depends on the entire sampling phase vector and that maximizing SINR cannot be achieved by selecting the sampling phase of each antenna signal independently.

To optimize output SINR, coordinated synchronization of the diversity signals (i.e. "joint sync") is performed. In other words, by determining the sampling phases $p_i$ collectively instead of individually, output SINR is maximized. In the present invention, joint synchronization is accomplished by considering various test sampling phase vectors p'. The output SINR is estimated for each test sampling phase vector p'. The test sampling phase vector p' that maximizes the output SINR is selected and used by the receiver to decimate the received signals. To reduce complexity, separate channel synchronization may be performed first, so that only a limited number of candidate sampling phase vectors about the separate sync result need be tested.

Figure 4:
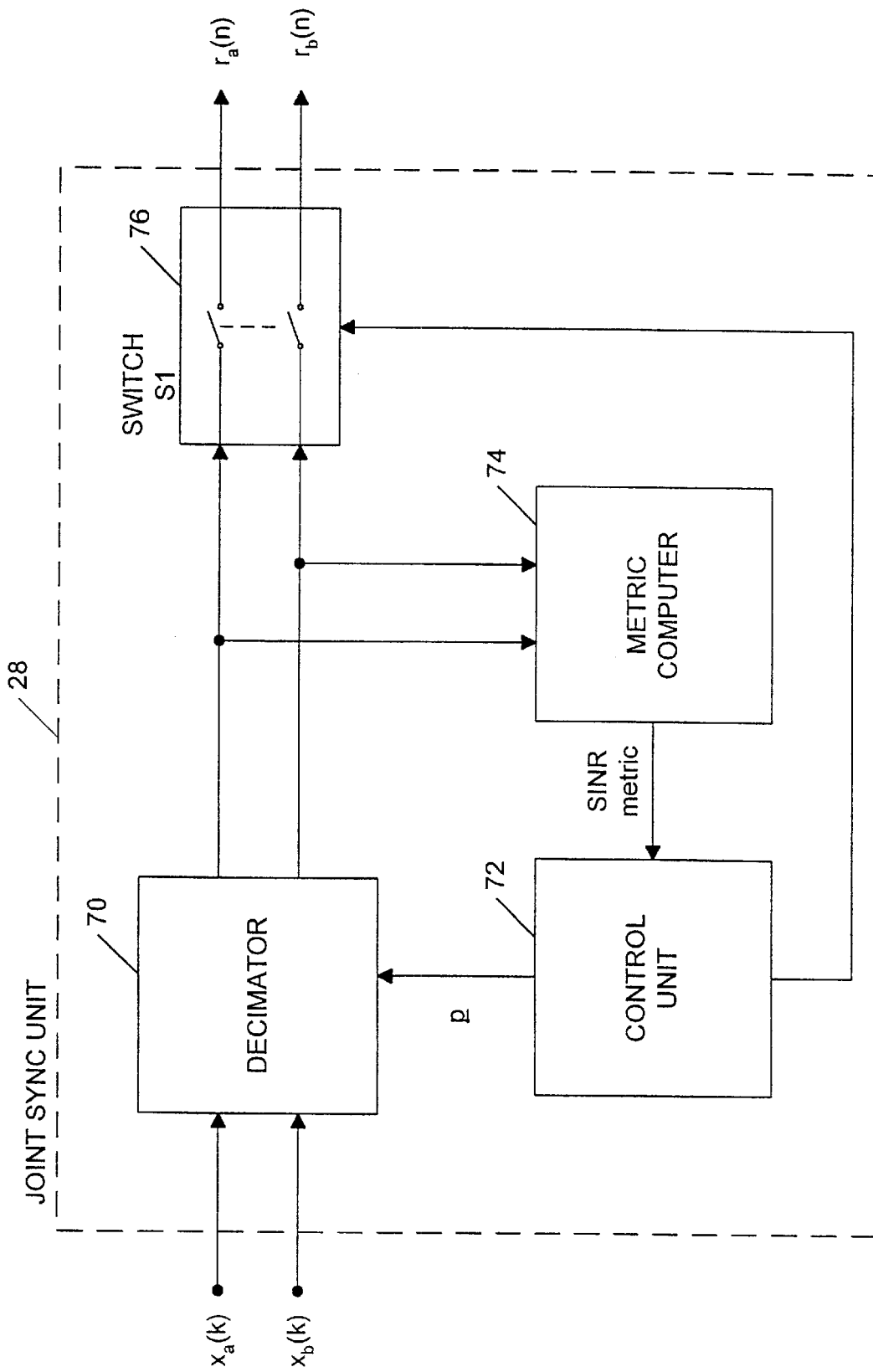
FIG. 4 is a block diagram of a joint sync unit in accordance with an embodiment of the present invention.

FIG. 4 illustrates a joint sync unit 28 in accordance with an embodiment of the present invention. Joint sync unit 28 includes a decimator 70, a control unit 72, a metric computer 74 and a double pole-single throw switch 76. Prior to processing, switch 76 is open to prevent spurious values of $r_i(n)$ from being passed to the demodulator 30.

Received signals $x_a(k)$ and $x_b(k)$ are provided to decimator 70. Received signals $x_a(k)$ and $x_b(k)$ may be buffered by one or more input buffers (not shown). The sampling phase vector p is provided to decimator 70 by control unit 72. Decimator 70 produces decimated signals $r_a(n)$ and $r_b(n)$ as output. Metric computer 74 receives decimated signals $r_a(n)$ and $r_b(n)$ and uses them to calculate a metric which predicts the performance of the subsequent process of interference cancellation. In the preferred embodiment, the metric is an estimate of the signal to impairment plus noise ratio (SINR) at the output of the receiver.

The control unit 72 provides various test sampling phase vectors p' to the decimator 70, and selects the sampling phase vector that results in the highest output SINR estimate.

The initial test sampling phase vector p' evaluated may be a previously selected sampling phase vector selected or it may be obtained through customary synchronization processing. In one embodiment of the present invention, a predetermined range of test sampling phase vectors near the initial sampling phase vector are evaluated, and the test sampling phase vector that produces the highest output SINR is selected and used to synchronize the diversity signals. However, it will be understood that other algorithms for selecting a test sampling phase vector may be employed without departing from the spirit or scope of the present invention.

Once the control unit 72 has identified the optimal sampling phase vector $p_{opt}$, the control unit 72 provides $p_{opt}$ to the decimator 70 and closes switch 76. Decimated signals $r_a(n)$ and $r_b(n)$ are thus provided to demodulator 30.

Figure 5:
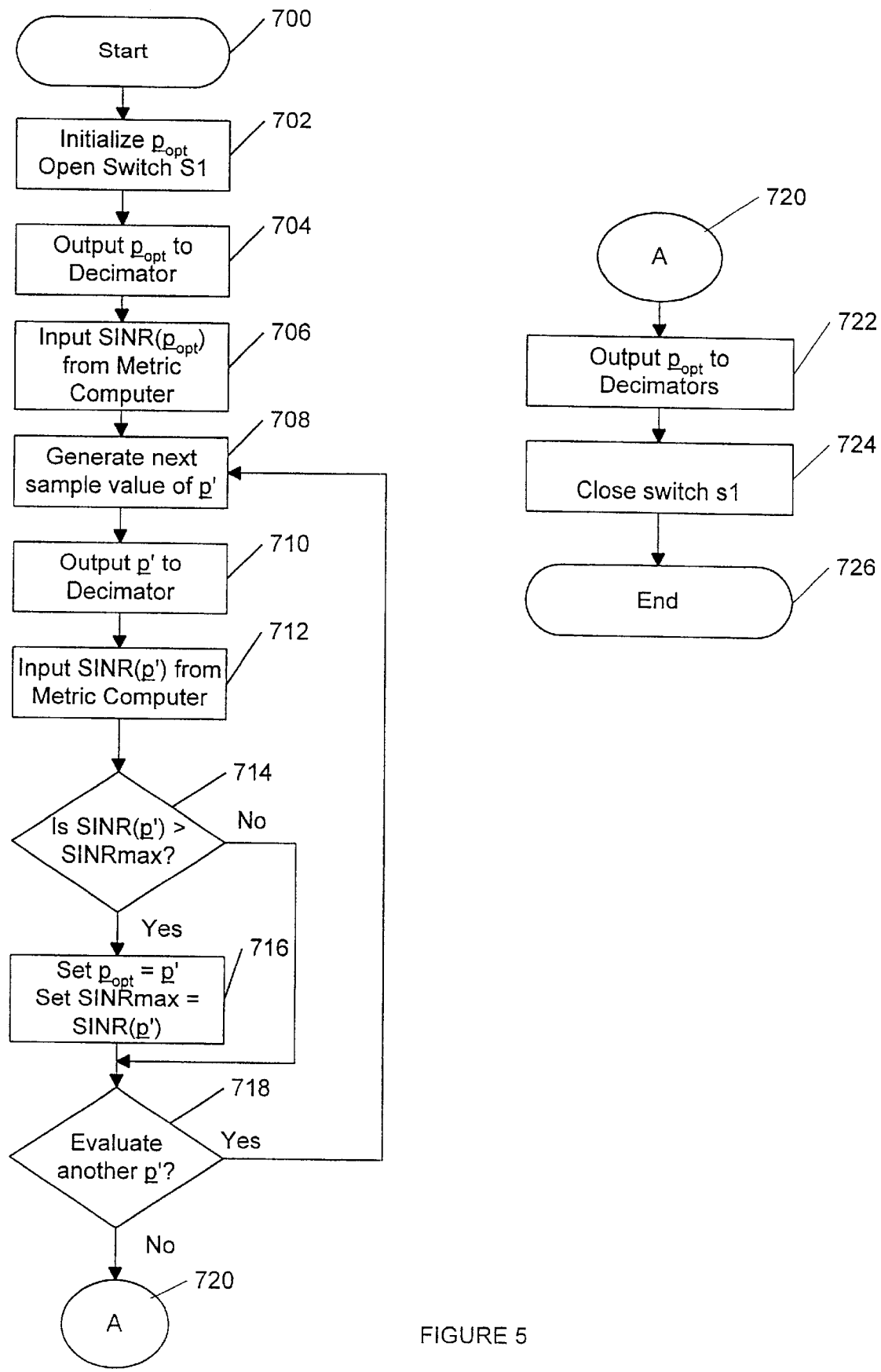
FIG. 5 is a flowchart showing the process of joint synchronization implemented by the joint sync unit of the embodiment of FIG. 4.

FIG. 5 illustrates a possible logic flow for control unit 72. First, switch 76 is opened and an initial value for $p_{opt}$ is selected. As described above, the initial value for $p_{opt}$ may be a previously selected value, or it may be obtained through customary synchronization techniques.

Next, $p_{opt}$ is output to decimator 70, which uses $p_{opt}$ to decimate received signals $x_a(k)$ and $x_b(k)$.

Then, a SINR estimate generated as a result of the use of $p_{opt}$ as the sampling phase vector is input from metric computer 74.

Next, a test sampling phase vector p' is generated by control unit 72. The generation of test sampling phases may be accomplished by any one of several algorithms. For example, the control unit may select one of a number of sampling phase vectors near the initial sampling phase vector. Or, the control unit may select and evaluate each possible sampling phase vector in turn.

Next, the selected test sampling phase vector p' is provided to decimator 70, which uses p' to decimate received signals $x_a(k)$ and $x_b(k)$.

Then, a SINR estimate generated as a result of the use of p' as the sampling phase vector is input from metric computer 74.

Next the SINR estimate based on p' is compared with the SINR estimate based on $p_{opt}$. If the SINR estimate based on p' is greater than the SINR estimate based on $p_{opt}$, then $p_{opt}$ is set equal to p', and the maximum SINR estimate is updated.

The control unit then determines whether to evaluate another test sampling phase vector. This decision will depend on whether all values of p' of interest have already been evaluated and may depend on whether an adequate SINR has been obtained. The control unit may also be forced by time or processing limitations to stop evaluating test values of p before all vectors of interest have been evaluated.

If the control unit determines that evaluation should continue, a new value of p' is selected, and processed as described above.

If the control unit determines that processing is complete and no further test sampling phase vector should be evaluated, then $p_{opt}$ is output to the decimator 70 and switch 76 is closed.

Figure 6:
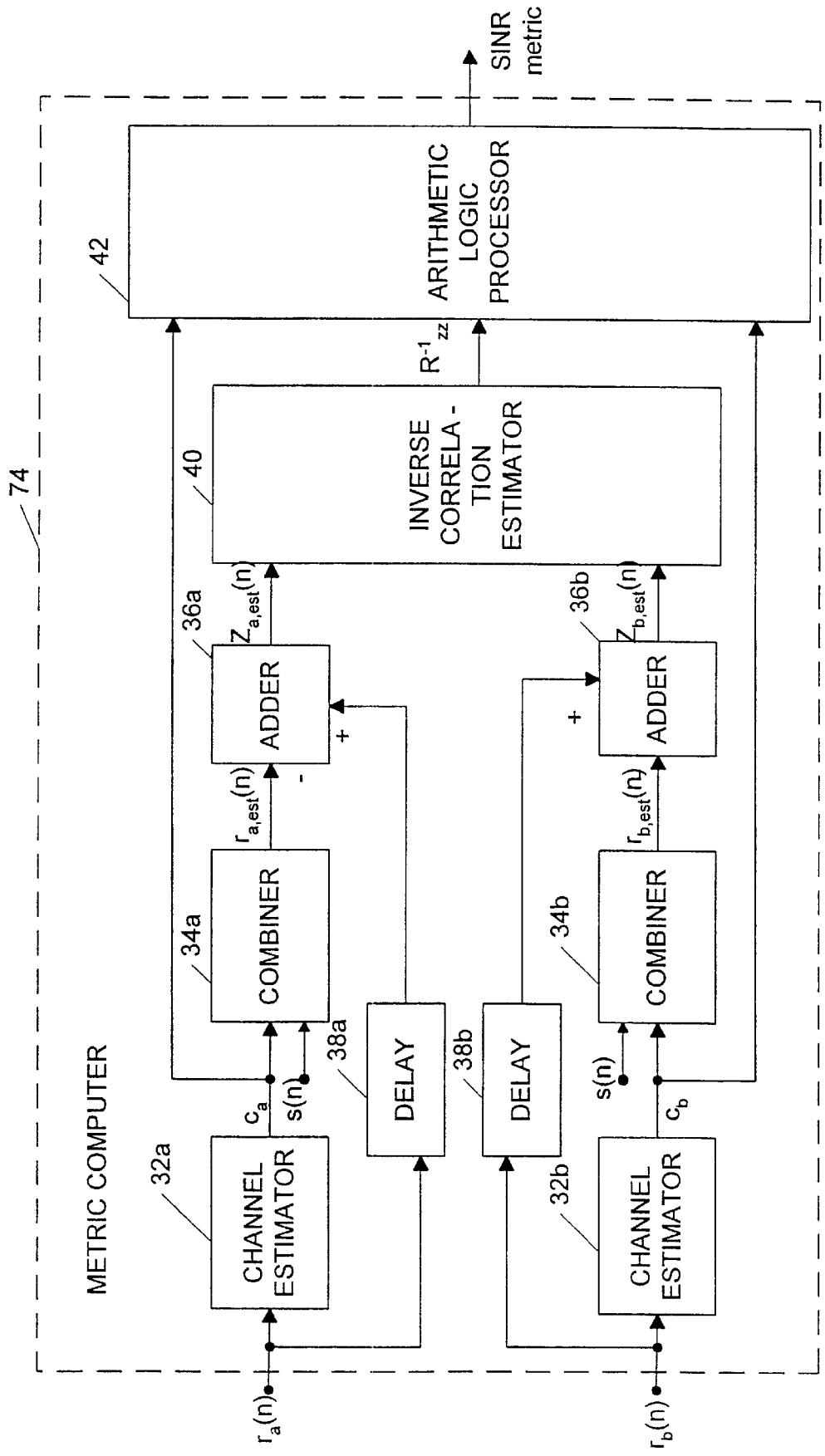
FIG. 6 is a block diagram of a metric computer in accordance with the embodiment of FIG. 4.

FIG. 6 illustrates a block diagram of a metric computer 74 in accordance with the embodiment of FIG. 4. Decimated samples $r_i(n)$ of the received signals are provided to channel tap estimators 32*a,b,* which estimate the signals' channel tap delays and coefficients $c_{est}$ using conventional techniques. These estimates are passed on to combiners 34*a,b,* which use known or detected information symbols and the channel tap coefficients to form estimates of the received signals, denoted in vector form as $r_{est}(k)$. Known information symbols may be used when the receiver is processing a set of predetermined information symbols, such as is the case, for example, during synchronization processing.

Delay units 38*a,b* impart a delay to the received signals equal to the delay imparted to the estimated received signals by the channel estimators 32*a,b*. The received signal estimates are subtracted from the received signals by adders 36*a,b*.

The outputs $z_{i,est}(n)$ of the adders 36*a,b* are estimates of the impairment components of the received signals. The impairment component estimates are denoted collectively as vector $z_{est}(k)$. The impairment estimates are then passed on to inverse correlation estimator 40, which generates an estimate of the inverse correlation matrix $R^{-1}_{zz}$. The inverse correlation matrix $R^{-1}_{zz}$ can be estimated directly using matrix inversion lemma approaches well known in the art, or it can be obtained by estimating and then inverting the correlation matrix. Other approaches are possible also, including estimation of the square root of the matrix or an LDU factorization.

The channel tap coefficients and the inverse correlation matrix estimate are passed on to arithmetic logic processor 42, which uses the provided values to calculate an estimate of the output SINR. The SINR estimate is then provided to the control unit 72, as described above. As new information symbols are continuously being received and processed by the receiver, the SINR estimates tend to change with time. Because the SINR estimates may be noisy and the optimal sampling phase vector may be changing slowly, it is desirable to smooth the SINR estimates in time, for example by using a low pass filter [not shown].

Figure 7:
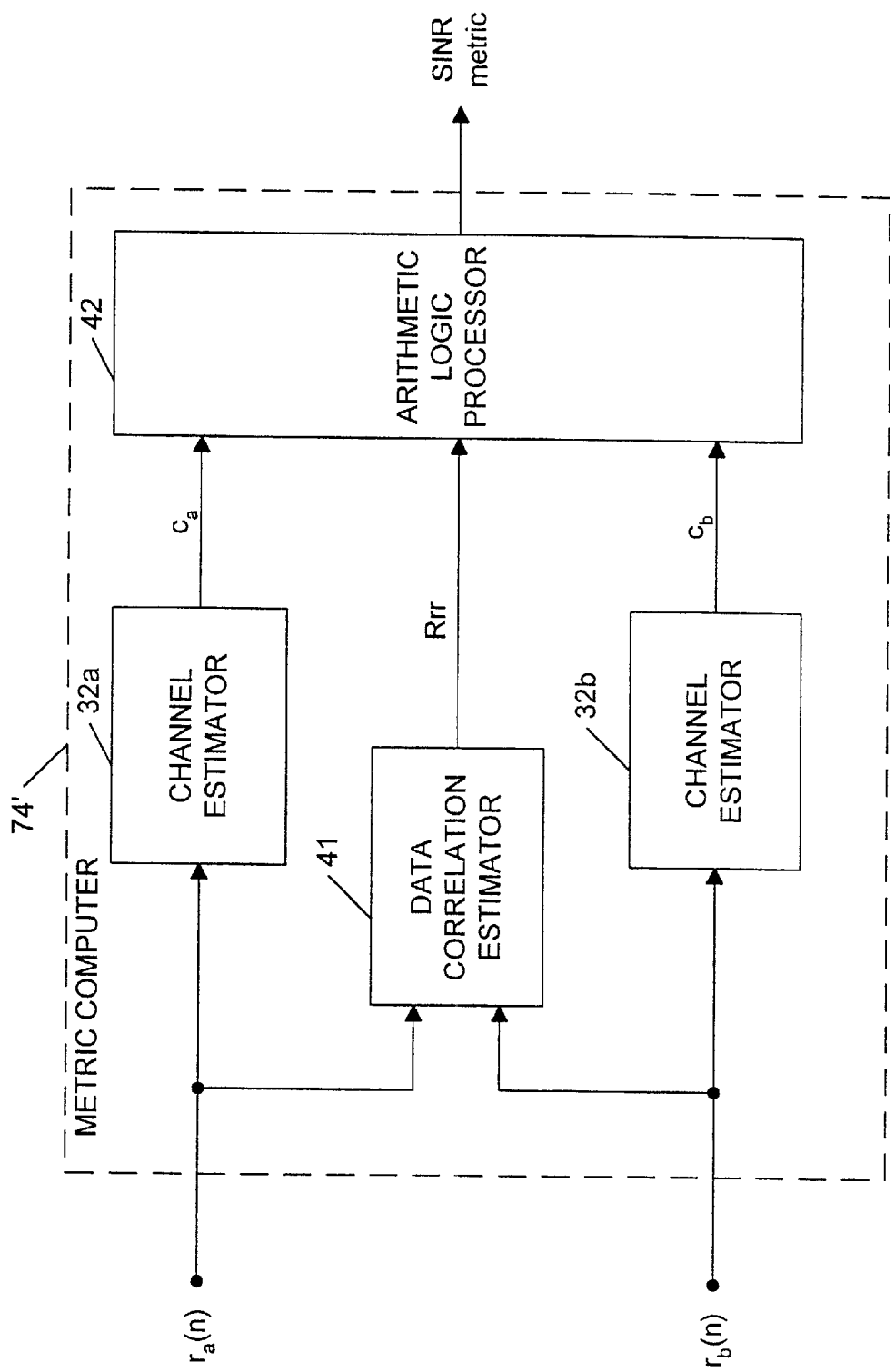
FIG. 7 is a block diagram of another embodiment of a metric computer in accordance with the embodiment of FIG. 4.

Other metrics related to output SINR or demodulator performance may be employed, such as replacing $R_{zz}$ with $R_{rr}$, the data correlation matrix, which is simpler to estimate. This approach is illustrated in FIG. 7, which shows a metric computer 74' which includes a data correlation estimator 41, a pair of channel estimators 32*a,b,* and an arithmetic logic processor 42. The data correlation estimator 41 accepts as input the decimated signals $r_a(n)$ and $r_b(n)$ and generates an estimate of the data correlation matrix $R_{rr}$ therefrom. Channel estimators 32*a,b* generate channel tap estimates $c_a$ and $c_b$ for the channels based on the decimated signals $r_a(n)$ and $r_b(n)$. The channel tap estimates $c_a$ and $c_b$ and the data correlation matrix $R_{rr}$ are provided to the arithmetic logic processor 42, which calculates a metric to be optimized. The metric is calculated according to the following equation:

$$\text{metric} = c^H R^{-1}_{rr} c \quad [7]$$

Figure 8:
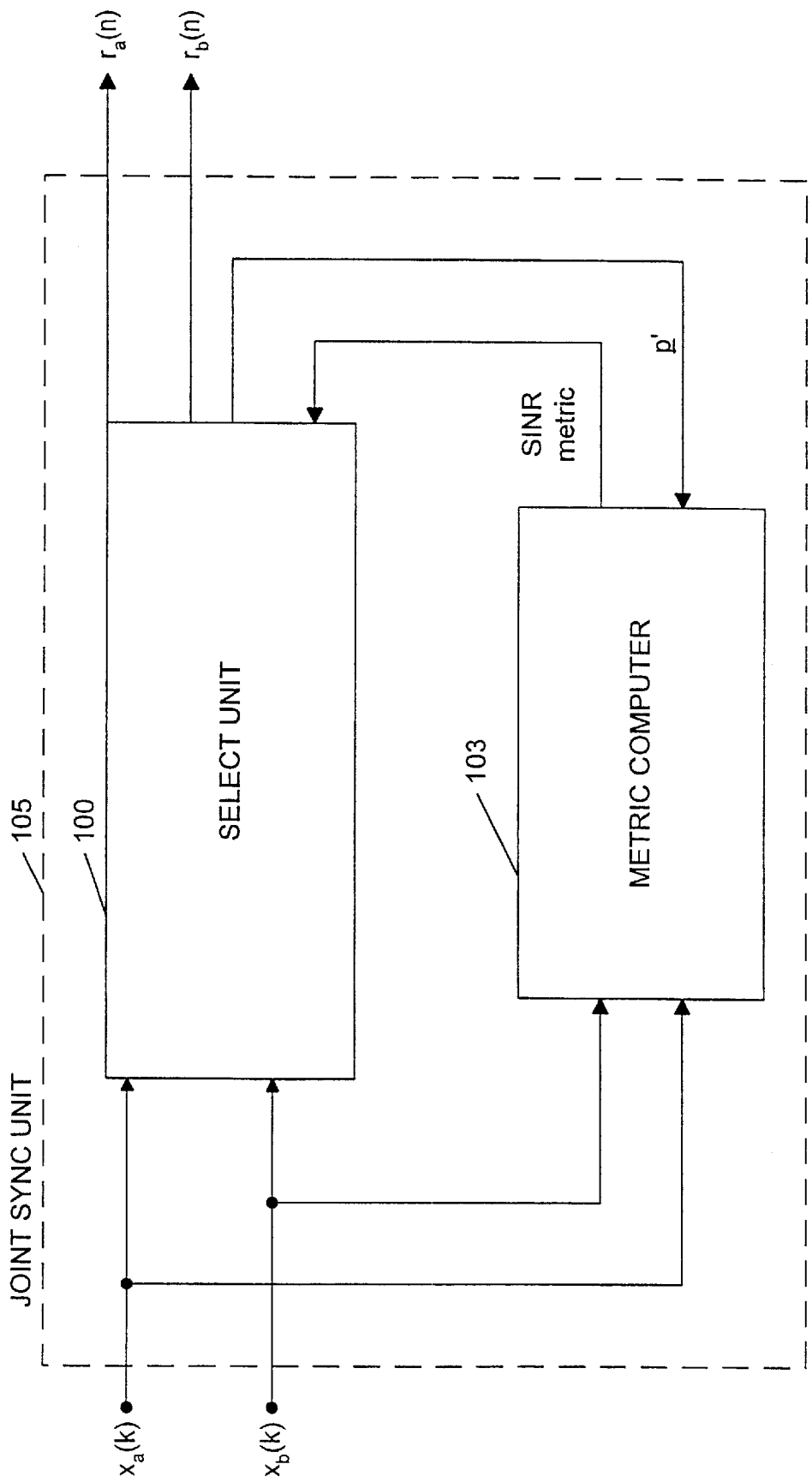
FIG. 8 is a block diagram of a joint sync unit in accordance with another embodiment of the present invention.

FIG. 8 illustrates another embodiment of the joint sync unit of the present invention. As illustrated in FIG. 8, joint sync unit 105 includes a select unit 100 and a metric computer 103. Select unit 100 receives signals $x_a(k)$ and $x_b(k)$ as input, and produces decimated signals $r_a(n)$ and $r_b(n)$ as output. Select unit 100 also generates test sampling phase vectors p' and outputs the test vectors to metric computer 103. Metric computer 103 accepts signals $x_a(k)$ and $x_b(k)$ as input along with the test sampling phase vector p' and generates an estimate of output SINR, which is provided to select unit 100.

Figure 9:
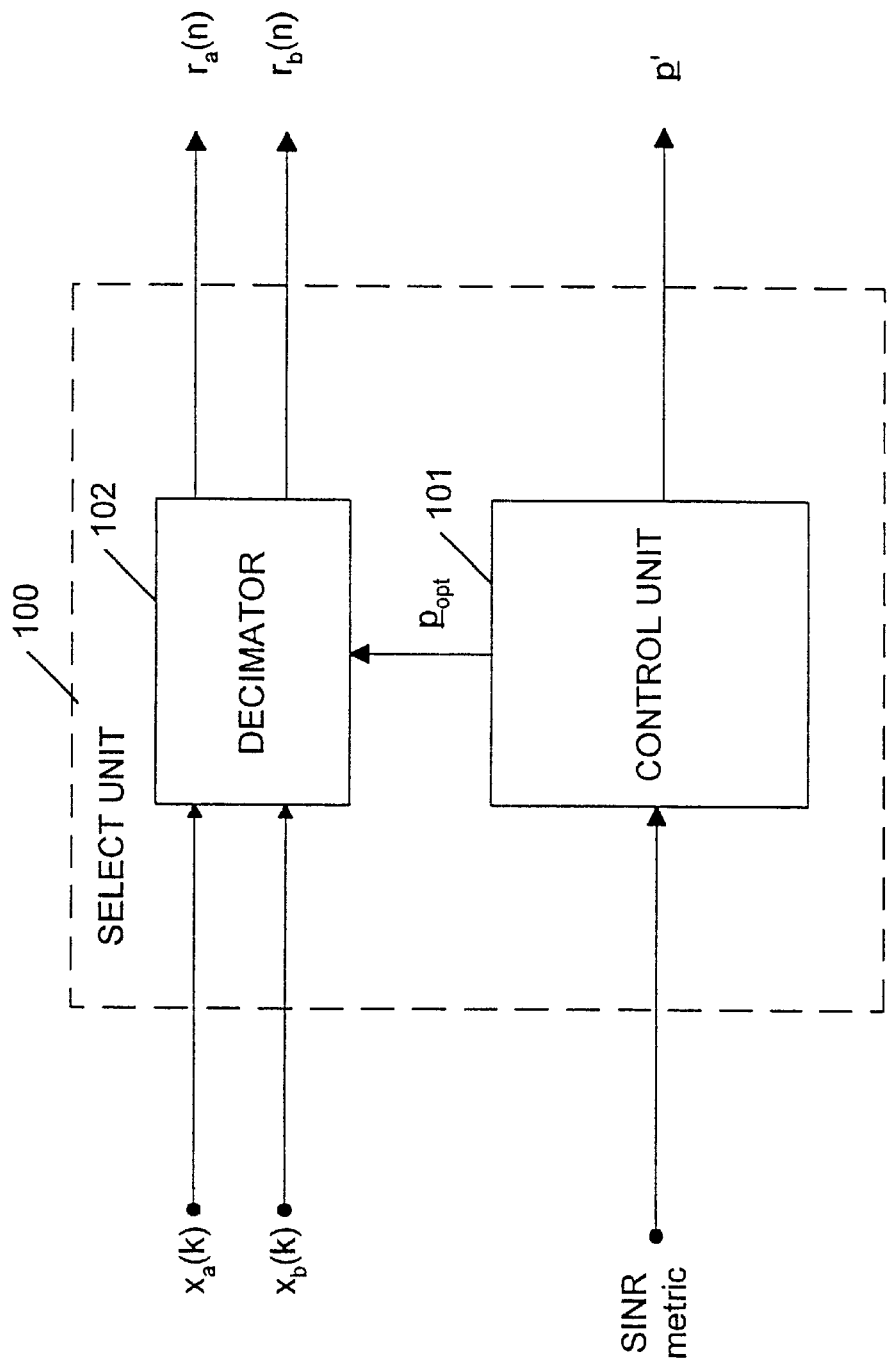
FIG. 9 is a block diagram of the select unit in accordance with the embodiment of FIG. 8.

As illustrated on FIG. 9, select unit 100 includes control unit 101 and decimator 102. Control unit 101 accepts a SINR estimate generated by metric computer 103 as input. Control unit 101 outputs an optimal sampling phase vector $p_{opt}$ to decimator 102, which uses $p_{opt}$ to decimate input signals $x_a(k)$ and $x_b(k)$. Control unit 101 also outputs a test sampling phase vector p' to metric computer 103, which calculates a SINR estimate based on the provided test sampling phase vector p'.

By using separate decimators in the select unit and the metric computer, the joint sync unit 105 of FIG. 8 has the capability of continuously evaluating different sampling phase vectors while the select unit 100 continues to process incoming signals using a previously selected sampling phase. This feature is useful in broadband communication systems, wherein it may be impossible or inconvenient to buffer an incoming sample stream for processing.

Figure 10:
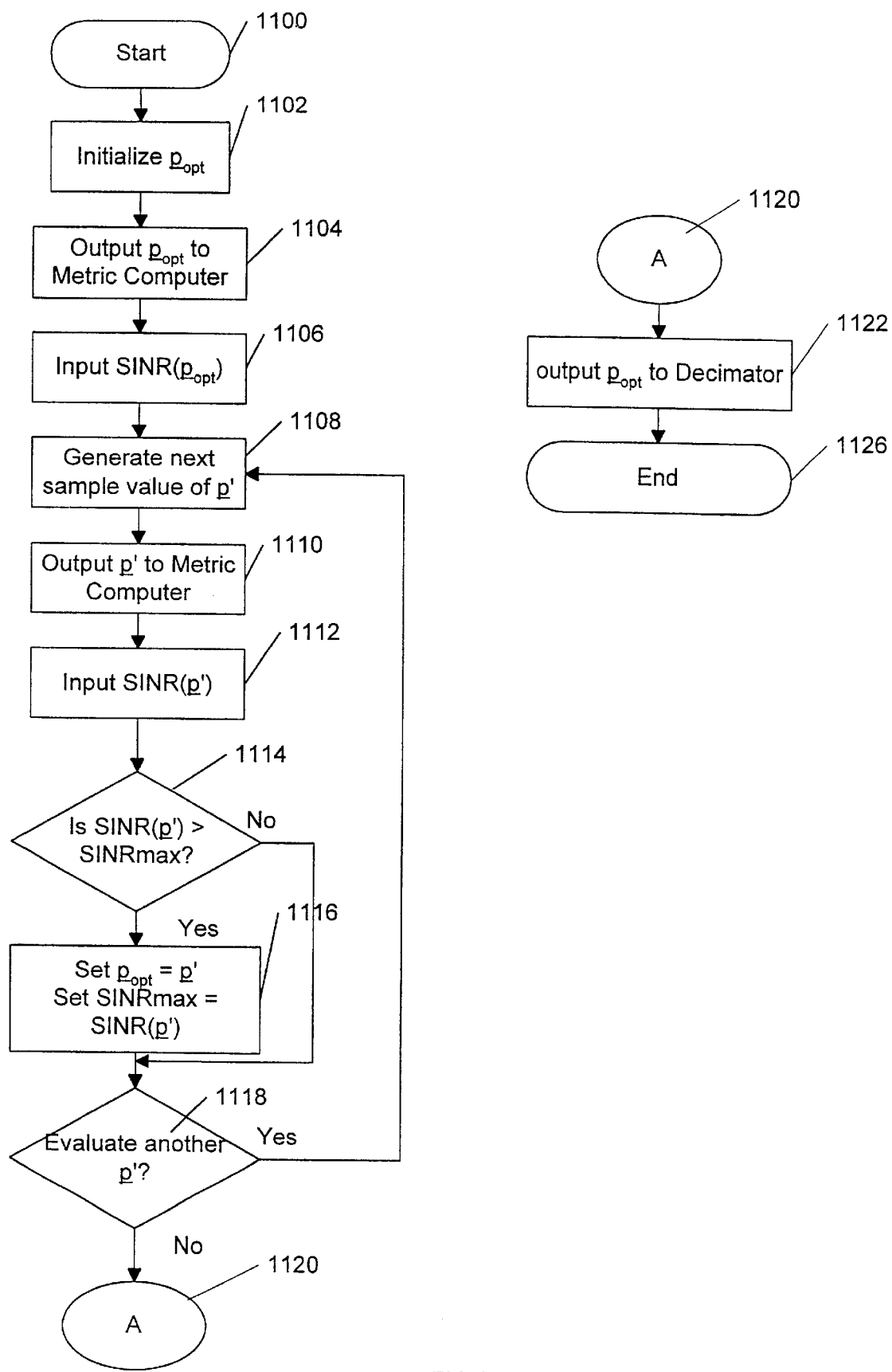
FIG. 10 is a flowchart showing the process of joint synchronization implemented by the joint sync unit of the embodiment of FIG. 8.

FIG. 10 illustrates a possible logic flow for control unit 101. First, an initial value for $p_{opt}$ is selected and provided to decimator 102. As described above, the initial value for $p_{opt}$ may be a previously selected value, or it may be obtained through customary synchronization techniques.

Next, $p_{opt}$ is output to metric computer 103, which uses $p_{opt}$ to decimate received signals $x_a(k)$ and $x_b(k)$.

Then, a SINR estimate generated as a result of the use of $p_{opt}$ as the sampling phase vector is output from metric computer 103 to select unit 100.

Next, a test sampling phase vector p' is generated by control unit 101 and provided to metric computer 103, which uses the test sampling phase vector p' to decimate received signals $x_a(k)$ and $x_b(k)$.

Then, a SINR estimate generated as a result of the use of p' as the sampling phase vector is output from metric computer 103 to select unit 100.

Next the SINR estimate based on p' is compared with the SINR estimate based on $p_{opt}$. If the SINR estimate based on p' is greater than the SINR estimate based on $p_{opt}$, then $p_{opt}$ is set equal to p' when appropriate, and the maximum SINR estimate is updated.

The control unit then determines whether to evaluate another test sampling phase vector. This decision will depend on whether all values of p' of interest have already been evaluated. The control unit may also be forced by time or processing limitations to stop evaluating test values of p before all vectors of interest have been evaluated.

If the control unit determines that evaluation should continue, a new value of p' is selected, and processed as described above.

If the control unit determines that processing is complete and no further test sampling phase vector should be evaluated, then $p_{opt}$ is output to the decimator 102.

Figure 11:
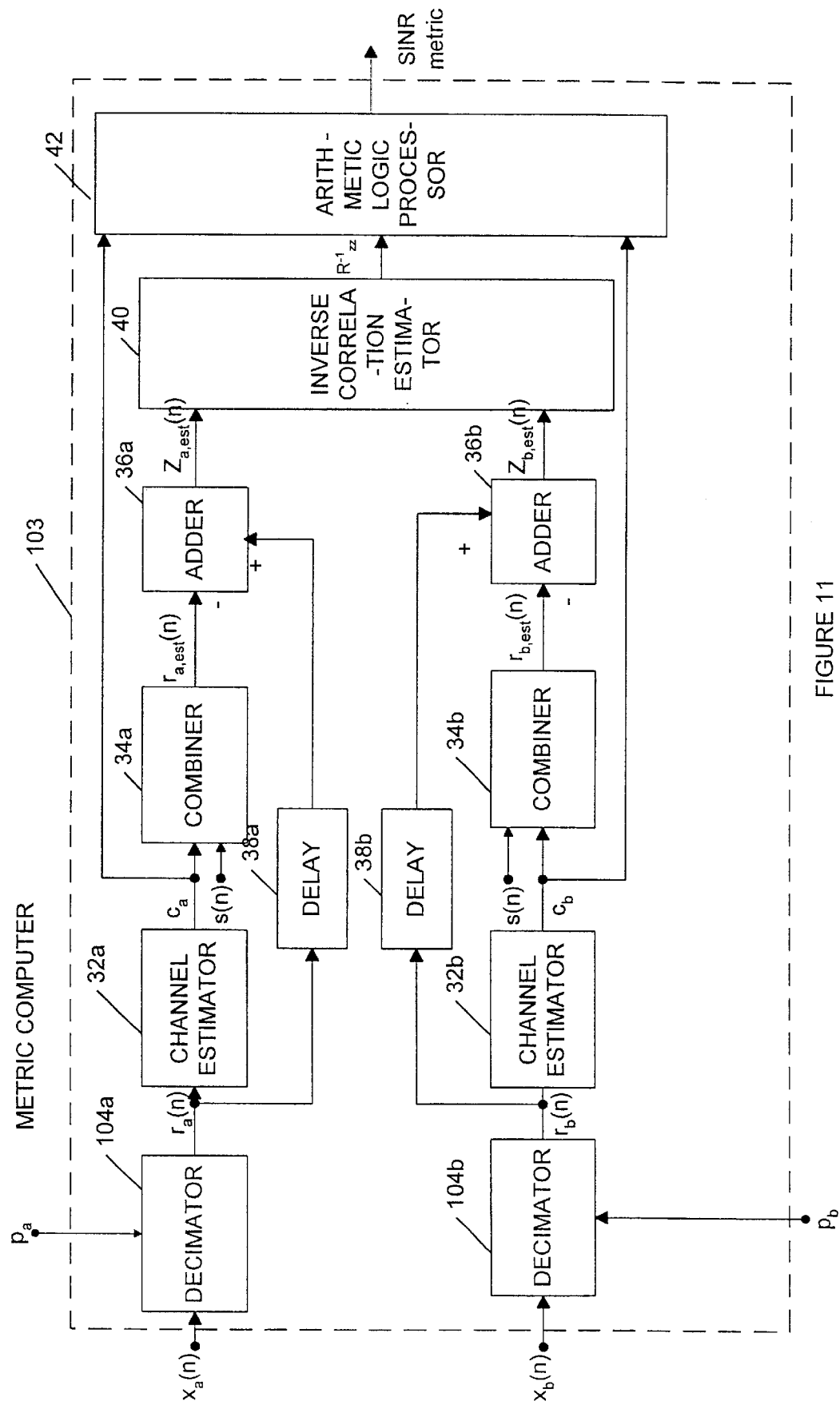
FIG. 11 is a block diagram of a metric computer in accordance with the embodiment of FIG. 8.

FIG. 11 illustrates, in block diagram format, metric computer 103 in accordance with the embodiment of FIG. 8.

Metric computer 103 includes decimators 104$a,b$, which accept received signals $x_a(k)$ and $x_b(k)$ as input along with test sampling phase values $P_a'$ and $P_b'$, respectively, and generate decimated signals $r_a(n)$ and $r_b(n)$, respectively.

Decimated signals $r_a(n)$ and $r_b(n)$ are provided to channel tap estimators 32$a,b$, which estimate the signals' channel tap coefficients $c_{est}$ using conventional techniques. These estimates are passed on to combiners 34$a,b$, which use known or detected information symbols and the channel tap coefficients to form estimates of the received signals denoted $r_{est}(k)$.

Delay units 38$a,b$ impart a delay to the received signals equal to the delay imparted to the estimated received signals by the channel estimators 32$a,b$. The received signal estimates are subtracted from the received signals by adders 36$a,b$.

The outputs $z_{i,est}(k)$ of the adders 36$a,b$ are estimates of the impairment components of the received signals. The impairment estimates are then passed on to inverse correlation estimator 40, which generates an estimate of the inverse correlation matrix $R^{-1}_{zz}$.

The channel tap coefficients and the inverse correlation matrix estimate are passed on to arithmetic logic processor 42, which uses the provided values to calculate an estimate of the output SINR. The SINR estimate is then provided to the select unit 100, as described above.

The present invention is readily extendible to an interference cancellation scheme given by Bottomley wherein the interference cancellation processor also equalizes the received signal. In that case, the received signal includes echoes which are delayed versions or images of the received signal. In the case of two received versions, a main version and an echo, the received signal after sync can be modeled as:

$$r'(n) = c_0 s(n) + c_1 s(n-1) + z(n) \qquad [8]$$

assuming one sample per symbol (M=1).

Thus, from the foregoing equation it is observed that the channel taps comprise vectors, $c_0$ and $C_1$, one vector per image or echo. Channel estimators 32 would estimate these channel taps and signal generator units 34 would use these estimates to remove the images, leaving estimates of the vectors of impairment values $z(n)$. The metric computer 42 would estimate SINR as follows:

$$SINR(p) = c_0^H(p) R^{-1}_{zz}(p) c_0(p) + c_1^H(p) R^{-1}_{zz}(p) c_1(p) \qquad [9]$$

Other metrics are possible.

The present invention is also readily extended to fractionally-spaced demodulation, in which more than one sample per symbol period is required. When M>1, SINR terms for each interleaved, symbol-spaced data stream can be added together.

While the invention has been described with regard to a receiver having two receive antennas, it will be appreciated by those skilled in the art that the invention may be applied to a receiver having any number of receive antennas, which antennas may not necessarily be widely spaced. Moreover, although the invention has been described with regards to multiple receive antennas, it is applicable to any multiple channel receiver, wherein the multiple channels could correspond to beams, different polarizations, or other channel forms. Also, the desired signal may be a set of desired signals that are jointly demodulated.

The present invention may also be applied to a variety of demodulation techniques, including linear and decision feedback equalization, as well as symbol-by-symbol MAP detection. The desired signal may be modulated in a variety of ways, including QPSK, $\pi$/4-DQPSK, GMSK and coded modulation. The demodulation process typically produces soft bit or symbol values which are further processed for channel decoding, such as block, convolutional or turbo decoding. Finally, the present invention is also applicable when "sync" symbols are absent or not known. Different hypotheses of the transmitted signals can be considered. For each hypothesis, the optimal sampling phase and SINR can be determined. The hypothesis and sampling phase that maximize SINR determine the sampling phase to use.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiment, it is also understood that this disclosure is only illustrative and exemplary of the present invention and is made merely for purpose of providing a full and enabling disclosure of the invention. Accordingly, it is intended that the invention be limited only by the spirit and scope of the claims appended hereto.

What is claimed is:

1. An apparatus for synchronizing a signal received over a first receive channel in a radio receiver, the radio receiver having multiple receive channels and a demodulator, the apparatus comprising:

first means for receiving a first signal corresponding to the first receive channel;

second means for receiving a second signal corresponding to a second receive channel; and synchronizing means, responsive to said first means and said second means, for synchronizing the first signal operative as a function of the first signal and the second signal, wherein said synchronizing means includes:

a control unit for generating a sampling phase for use in synchronizing the first signal;

a decimator, connected to said first means and said control unit, for decimating the first signal responsive to the sampling phase generated by said control unit; and a metric computer responsive to said decimator, for generating a metric predictive of the performance of the demodulator.

2. The apparatus of claim 1, wherein said control unit receives the metric generated by said metric computer and generates the sampling phase in response to the metric.

3. The apparatus of claim 2, wherein said synchronizing means includes a switch controlled by said control unit, said switch having a first position and a second position, wherein when in the first position, said switch is operative to permit the apparatus to output decimated signals to the demodulator, and when in the second position, said switch is operative to prevent the apparatus from outputting decimated signals to the demodulator.

4. The apparatus of claim 2, wherein the metric generated by said metric computer includes an estimate of the signal to impairment plus noise ratio of the demodulator output.

5. The apparatus of claim 4 wherein said metric computer comprises:

at least two channel estimators for estimating channel tap coefficients corresponding to the first signal and the second signal;

at least two delay units for delaying the first and second signals;

at least two combiners, each connected to one of said channel estimators, for combining known or detected information symbols with channel tap coefficients, to produce desired signal values; and at least two adders, each connected to one of said combiners and one of said delay units, for subtracting the desired signal values from the delayed signals to produce impairment components of the first and second signals.

6. The apparatus of claim 5, wherein said metric computer further comprises:

an inverse correlation estimator, connected to said adders, for generating an estimated inverse correlation matrix from the impairment components of the first and second signals; and an arithmetic logic processor, connected to said inverse correlation estimator and said channel estimators, for forming the metric from the inverse correlation matrix and the channel tap coefficients.

7. The apparatus of claim 4 wherein said metric computer comprises:

at least two channel estimators for estimating channel tap coefficients for the first signal and the second signal;

a data correlation estimator for estimating a data correlation matrix for the first and second signals; and an arithmetic logic processor, connected to said data correlation estimator and said channel estimators, for forming the metric from the data correlation matrix and the channel tap coefficients.

8. An apparatus for synchronizing a signal received over a first receive channel in a radio receiver, the radio receiver having multiple receive channels and a demodulator, the apparatus comprising:

first means for receiving a first signal corresponding to the first receive channel;

second means for receiving a second signal corresponding to a second receive channel; and synchronizing means for synchronizing the first signal operative as a function of the first signal and the second signal, wherein said synchronizing means includes a select unit connected to said first means and said second means and a metric computer for generating a metric predictive of the performance of the demodulator connected to said first means and said second means, wherein said select unit includes:

a control unit for generating a test sampling phase and a selected sampling phase for use in synchronizing the first signal; and a decimator for decimating the first signal responsive to the selected sampling phase generated by said control unit.

9. The apparatus of claim 8 wherein said metric computer comprises:

at least one decimator for decimating the first signal responsive to the test sampling phase generated by said select unit;

at least two channel estimators for estimating channel tap coefficients corresponding to the first signal and the second signal;

at least two delay units for delaying the first and second signals;

at least two combiners, each connected to one of said channel estimators, for combining known or detected information symbols with channel tap coefficients, to produce desired signal values; and at least two adders, each connected to one of said combiners and one of said delay units, for subtracting the desired signal values from the delayed signals to produce impairment components of the first and second signals.

10. The apparatus of claim 9, wherein said metric computer further comprises:

an inverse correlation estimator, connected to said adders, for generating an estimated inverse correlation matrix from the impairment components of the first and second signals; and an arithmetic logic processor, connected to said inverse correlation estimator and said channel estimators, for forming the metric from the inverse correlation matrix and the channel tap coefficients.

11. The apparatus of claim 10, wherein the metric generated by the arithmetic logic processor includes an estimate of the signal to impairment plus noise ratio of the demodulator output.

12. A method for joint synchronization of signals received over multiple receive channels in a radio receiver having a demodulator, the method comprising the steps of:

generating a set of test sampling phase vectors;

decimating the signals responsive to the test sampling phase vectors, thereby producing decimated signals;

for each test sampling phase vector, generating a metric predictive of the performance of the demodulator based on such test sampling phase vector:

selecting the test sampling phase vector that optimizes performance of the demodulator;

decimating the signals responsive to the selected sampling phase vector; and upon selection of a sampling phase vector that optimizes performance of the demodulator, closing a switch to permit the output of decimated signals to the demodulator.

13. In a receiver having a demodulator, an apparatus for joint synchronization of signals received across multiple channels, said apparatus comprising:

a joint synchronization unit operatively receiving first and second received signals transmitted across first and second channels, respectively, and outputting first and second synchronized signals corresponding to respective ones of said first and second received signals, wherein said joint synchronization unit determines the sample phase of each of said first and second synchronized signals as a function of both the first and second received signals.

14. The apparatus of claim 13, wherein the synchronization performance by the joint synchronization unit comprises symbol synchronization.

15. In a receiver having a demodulator, an apparatus for joint synchronization of signals received across multiple channels, said apparatus comprising:

a joint synchronization unit operatively receiving first and second signals transmitted across first and second channels, respectively, and developing first and second synchronized signals each as a function of the first and second received signals, wherein the joint synchronization unit comprises:

a control unit generating a sampling phase signal for use in synchronizing the first and second received signals;

a decimator receiving the first and second received signals and the sampling phase signal and developing first and second synchronized decimated signals corresponding to the first and second synchronized signals, respectively; and a metric computer receiving the first and second synchronized decimated signals and developing a metric predictive of demodulator performance, wherein the metric is used by the control unit in generating the sampling phase signal.

16. The apparatus of claim 15, wherein the developed metric comprises an estimate of signal to impairment plus noise ratio at a demodulator output.

17. The apparatus of claim 15, further comprising a switch operatively controlled by the control unit between first and second positions, wherein with the switch in the first position the first and second synchronized signals are permitted to pass to the demodulator, and wherein with the switch in the second position the first and second synchronized signals are prohibited from passing to the demodulator.

18. The apparatus of claim 17, wherein the control unit controls the switch position based on an analysis of at least one of the sampling phase signal values and the developed metric.

19. The apparatus of claim 15, wherein the metric computer comprises:

first and second channel estimators receiving the first and second synchronized decimated signals and developing first and second channel estimates, respectively;

first and second delay units delaying the first and second synchronized decimated signals;

first and second combiners combining the first and second channel estimates with known or detected information symbols to develop first and second received signal estimates, respectively; and first and second adders subtracting the first and second received signal estimates from the first and second delayed synchronized decimated signals, respectively, to develop first and second impairment components of the first and second received signals, respectively, the first and second impairment components and the first and second channel estimates used by the metric computer to develop the metric.

20. The apparatus of claim 19, wherein the metric computer further comprises:

an inverse correlation estimator receiving the first and second impairment components and developing an estimated inverse correlation matrix; and an arithmetic logic processor receiving the estimated inverse correlation matrix and the first and second channel estimates and developing the metric based thereon.

21. The apparatus of claim 20, wherein the inverse correlation estimator develops the estimated inverse correlation matrix using at least one of matrix inversion lemma techniques, estimating then inverting the correlation matrix, estimating the square root of the correlation matrix, and LDU factorization.

22. The apparatus of claim 20, wherein the metric is developed by the arithmetic logic processor using the formula, $$\text{metric} = c^H(p) R^{-1}_{zz}(p) c(p),$$

wherein p is a vector of the sampling phase signals, c is a vector of the channel estimates, $R^{-1}_{zz}$ is the estimated inverse correlation matrix, and the superscript H denotes a conjugate transpose.

23. The apparatus of claim 15, wherein the metric computer comprises:

first and second channel estimators receiving the first and second synchronized decimated signals and developing first and second channel estimates, respectively;

a data correlation estimator receiving the first and second synchronized decimated signals and developing an estimated data correlation matrix; and an arithmetic logic processor receiving the estimated data correlation matrix and the first and second channel estimates and developing the metric based thereon.

24. The apparatus of claim 23, wherein the metric is developed by the arithmetic logic processor using the formula, $$\text{metric} = c^H R^{-1}_{rr} c,$$

wherein c is a vector of the channel estimates, $R^{-1}_{rr}$ is the estimated data correlation matrix, and the superscript H denotes a conjugate transpose.

25. In a receiver having a demodulator, an apparatus for joint synchronization of signals received across multiple channels, said apparatus comprising:

a joint synchronization unit operatively receiving first and second signals transmitted across first and second channels, respectively, and developing first and second synchronized signals each as a function of the first and second received signals, wherein the joint synchronization unit comprises:

a select unit receiving the first and second received signals and developing the first and second synchronized signals and first and second test sampling phase signals; and a metric computer receiving the first and second received signals and the test sampling phase signals and developing a metric therefrom, the metric used by the select unit to develop the first and second synchronized signals.

26. The apparatus of claim 25, wherein the select unit comprises:

a control unit receiving the metric and developing selected sampling phase signals and the first and second test sampling phase signals; and a decimator receiving the first and second received signals and the selected sampling phase signals and developing first and second synchronized decimated signals corresponding to the first and second synchronized signals based on the selected sampling phase signals.

27. The apparatus of claim 25, wherein the developed metric comprises an estimate of signal to impairment plus noise ratio at the demodulator output.

28. The apparatus of claim 25, wherein the metric computer comprises:

first and second decimators receiving the first and second received signals, respectively, and the test sampling phase signals and developing first and second decimated signals, respectively;

first and second channel estimators receiving the first and second decimated signals and developing first and second channel estimates, respectively;

first and second delay units delaying the first and second decimated signals;

first and second combiners combining the first and second channel estimates with known or detected information symbols to develop first and second received signal estimates, respectively; and first and second adders subtracting the first and second received signal estimates from the first and second delayed decimated signals, respectively, to develop first and second impairment components of the first and second received signals, respectively, the first and second impairment components and the first and second channel estimates used by the metric computer to develop the metric.

29. The apparatus of claim 28, wherein the metric computer further comprises:

an inverse correlation estimator receiving the first and second impairment components and developing an estimated inverse correlation matrix; and an arithmetic logic processor receiving the estimated inverse correlation matrix and the first and second channel estimates and developing the metric based thereon.

30. A receiver having joint synchronization capabilities for signals received across multiple channels, said receiver comprising:

a first antenna for receiving a first received signal transmitted across a first channel;

a second antenna for receiving a second received signal transmitted across a second channel;

a joint synchronization unit operatively receiving the first and second received signals and outputting first and second synchronized signals corresponding to respective ones of said first and second received signals, wherein said joint synchronization unit determines the sample phase of each of said first and second synchronized signals as a function of both the first and second received signals; and a demodulator demodulating the first and second synchronized signals and developing an output signal as an estimate of an originally transmitted signal represented by the first and second received signals.

31. The receiver of claim 30, wherein the demodulator comprises an interference cancelling processor.

32. The receiver of claim 30, further comprising first and second signal preprocessors displaced between the first and second antennas and the joint synchronization unit, the first and second signal preprocessors receiving the first and second received signals from the first and second antennas, respectively, and converting the first and second received signals into first and second discrete sample streams which are provided to the joint synchronization unit as the first and second received signals, respectively.

33. The receiver of claim 32, wherein the synchronization performed by the joint synchronization unit comprises symbol synchronization.

34. A receiver having joint synchronization capabilities for signals received across multiple channels, said receiver comprising:

a first antenna for receiving a first signal transmitted across a first channel;

a second antenna for receiving a second signal transmitted across a second channel;

a joint synchronization unit operatively receiving the first and second received signals and developing first and second synchronized signals each as a function of the first and second received signals, wherein the joint synchronization unit comprises:

a control unit generating a sampling phase signal for use in synchronizing the first and second received signals;

a decimator receiving the first and second received signals and the sampling phase signal and developing first and second synchronized decimated signals corresponding to the first and second synchronized signals, respectively; and a metric computer receiving the first and second synchronized decimated signals and developing a metric predictive of demodulator performance, wherein the metric is used by the control unit in generating the sampling phase signal; and a demodulator demodulating the first and second synchronized signals and developing an output signal as an estimate of an originally transmitted signal represented by the first and second received signals.

35. The receiver of claim 34, wherein the developed metric comprises an estimate of signal to impairment plus noise ratio at a demodulator output.

36. The receiver of claim 34, further comprising a switch operatively controlled by the control unit between first and second positions, wherein with the switch in the first position the first and second synchronized signals are permitted to pass to the demodulator, and wherein with the switch in the second position the first and second synchronized signals are prohibited from passing to the demodulator.

37. The apparatus of claim 36, wherein the control unit controls the switch position based on an analysis of at least one of the sampling phase signal values and the developed metric.

38. The receiver of claim 34, wherein the metric computer comprises:

first and second channel estimators receiving the first and second synchronized decimated signals and developing first and second channel estimates, respectively;

first and second delay units delaying the first and second synchronized decimated signals and developing first and second channel estimates, respectively;

first and second delay units delaying the first and second synchronized decimated signals first and second combiners combining the first and second channel estimates with known or detected information symbols to develop first and second received signal estimates, respectively; and first and second adders subtracting the first and second received signal estimates from the first and second delayed synchronized decimated signals, respectively, to develop first and second impairment components of the first and second received signals, respectively, the first and second impairment components and the first and second channel estimates used by the metric computer to develop the metric.

39. The receiver of claim 38, wherein the metric computer further comprises:

an inverse correlation estimator receiving the first and second impairment components and developing an estimated inverse correlation matrix; and an arithmetic logic processor receiving the estimated inverse correlation matrix and the first and second channel estimates and developing the metric based thereon.

40. The receiver of claim 39, wherein the inverse correlation estimator develops the estimated inverse correlation matrix using at least one of matrix inversion lemma techniques, estimating then inverting the correlation matrix, estimating the square toot of the correlation matrix, and LDU factorization.

41. The receiver of claim 39, wherein the metric is developed by the arithmetic logic processor using the formula, $$\text{metric}=c^H(p)R^{-1}_{zz}(p)c(p),$$

wherein p is a vector of the sampling phase signals, c is a vector of the channel estimates, $R^{-1}_{zz}$ is the estimated inverse correlation matrix, and the superscript H denotes a conjugate transpose.

42. The receiver of claim 34, wherein the metric computer comprises:

first and second channel estimators receiving the first and second synchronized decimated signals and developing an estimated data correlation matrix; and an arithmetic logic processor receiving the estimated data correlation matrix and the first and second channel estimates and developing the metric based thereon.

43. The receiver of claim 42, wherein the metric is developed by the arithmetic logic processor using the formula, $$\text{metric}=c^H R^{-1}_{rr}c,$$

wherein c is a vector of the channel estimates, $R^{-1}_{rr}$ is the estimated data correlation matrix, and the superscript H denotes a conjugate transpose.

44. A receiver having joint synchronization capabilities for signals received across multiple channels, said receiver comprising:

a first antenna for receiving a first signal transmitted across a first channel;

a second antenna for receiving a second signal transmitted across a second channel;

a joint synchronization unit operatively receiving the first and second received signals and developing first and second synchronized signals each as a function of the first and second received signals, wherein the joint synchronization unit comprises:

a select unit receiving the first and second received signals and developing the first and second synchronized signals and first and second test sampling phase signals; and a metric computer receiving the first and second received signals and the test sampling phase signals and developing a metric therefrom, the metric used by the select unit to develop the first and second synchronized signals; and a demodulator demodulating the first and second synchronized signals and developing an output signal as an estimate of an originally transmitted signal represented by the first and second received signals.

45. The receiver of claim 44, wherein the select unit comprises:

a control unit receiving the metric and developing selected sampling phase signals and the first and second test sampling phase signals; and a decimator receiving the first and second received signals and the selected sampling phase signals and developing first and second synchronized decimated signals corresponding to the first and second synchronized signals based on the selected sampling phase signals.

46. The receiver of claim 44, wherein the developed metric comprises an estimate of signal to impairment plus noise ratio at the demodulator output.

47. The receiver of claim 44, wherein the metric computer comprises:

first and second decimators receiving the first and second received signals, respectively, and the test sampling phase signals and developing first and second decimated signals, respectively;

first and second channel estimators receiving the first and second decimated signals and developing first and second channel estimates, respectively;

first and second delay units delaying the first and second decimated signals;

first and second combiners combining the first and second channel estimates with known or detected information symbols to develop first and second received signal estimates, respectively; and first and second adders subtracting the first and second received signal estimates from the first and second delayed decimated signals, respectively, to develop first and second impairment components of the first and second received signals, respectively, the first and second impairment components and the first and second channel estimates used by the metric computer to develop the metric.

48. The receiver of claim 47, wherein the metric computer further comprises:

an inverse correlation estimator receiving the first and second impairment components and developing an estimated inverse correlation matrix; and an arithmetic logic processor receiving the estimated inverse correlation matrix and the first and second channel estimates and developing the metric based thereon.

49. A method for joint synchronization of signals received across multiple channels comprising the steps of:

receiving first and second versions of a signal transmitted across first and second channels, respectively;

developing a plurality of test sampling phase vectors;

decimating the received first and second signal versions using the plurality of test sampling phase vectors producing a plurality of decimated first and second signal versions;

calculating, using the decimated first and second signal versions, a metric for each of the plurality of test sampling phase vectors; and selecting a test sampling phase vector based upon the metrics for use in decimating the received first and second signal versions.

50. The method of claim 49, further comprising the step of demodulating the decimated first and second signal versions associated with the selected test sampling phase vector to develop an output signal representative of the originally transmitted signal.

51. The method of claim 49, wherein the calculated metrics are estimates of Signal to Impairment plus Noise Ratio (SINR), and wherein the selected test sampling phase vector is associated with the highest SINR estimate.

52. The method of claim 50, wherein the calculated metrics are predictive of demodulation performance, and wherein the selected test sampling vector is associated with a metric indicative of optimum demodulation performance.

53. The method of claim 50, wherein the demodulating step is performed by an interference cancelling processor.

54. The method of claim 49, further comprising the step of upon selection of the test sampling phase vector, closing a switch outputting the decimated first and second signal versions, decimated using the selected test sampling phase vector, for demodulation.

55. A method of jointly synchronizing two or more received signals received over multiple communication channels, said method comprising:

iteratively computing a performance metric predictive of the performance of a demodulator for two or more trial sample phase vectors, each said trial sample phase vector comprising a sample phase estimate for each of said received signals; and selecting an optimal sample phase vector from among said trial sample phase vectors based on said performance metrics; and generating synchronized signals corresponding to respective ones of said received signals based on said optimal sample phase vector.

56. The method of claim 55 wherein iteratively computing a performance metric predictive of the performance of a demodulator for two or more trial sample phase vectors comprises, during each iteration:

decimating said received signals based on corresponding ones of said sample phase estimates in a selected one of said trial sample phase vectors to produce decimated signals corresponding to each said received signal;

computing said performance metric based on said decimated signals and said trial sample phase vector.

57. The method of claim 55 wherein generating synchronized signals corresponding to respective ones of said received signals based on said sample phase vector comprises decimating said received signals based on corresponding ones of said sample phase estimates in said selected sample phase vector to produce synchronized signals corresponding to said received signals.

58. The method of claim 55 wherein selecting an optimal sample phase vector from among said trial sample phase vectors based on said performance metrics comprises selecting a trial sample phase vector that maximizes said performance metric as said optimal sample phase vector.

59. The method of claim 55 wherein selecting an optimal sample phase vector from among said trial sample phase vectors based on said performance metrics comprises comparing said performance metrics computed during each iteration to a threshold and selecting one of said performance metrics as said optimal sample phase vector based on said comparisons.

60. The method of claim 56 wherein computing said performance metric based on said decimated signals and said trial sample phase vector comprises:

generating a channel estimate corresponding to each received signal based on said decimated signals;

generating received signal estimates corresponding to each of said received signals based on said decimated signals and said channel estimates;

determining the impairment components for each of said received signals based on said received signal estimates;

generating an inverse correlation matrix based on said impairment components associated with each of said received signals; and computing said performance metric based on said channel estimates and said inverse correlation matrix.

61. The method of claim 56 wherein computing said performance metric based on said decimated signals and said trial sample phase vector comprises:

generating a channel estimate corresponding to each received signal based on said decimated signals;

generating a data correlation matrix based on said decimated signals; and computing said performance metric based on said channel estimates and said data correlation matrix.

62. The method of claim 56 wherein computing said performance metric based on said decimated signals and said trial sample phase vector comprises computing a signal to noise ratio.

63. The method of claim 62 wherein computing said performance metric based on said decimated signals and said trial sample phase vector comprises computing a signal to noise plus interference ratio.

64. An apparatus for jointly synchronizing two or more received signals, each received over a respective receive channel, said apparatus comprising:

a metric computer to compute a performance metric corresponding to each one of a plurality of trial sample phase vectors, each said trial sample phase vector comprising a sample phase estimate for each of said received signals;

a control unit to select one of said trial sample phase vectors based on said performance metrics; and at least one first decimator responsive to said control unit to generate synchronized signals corresponding to each of said received signals based on said selected trial sample phase vector.

65. The apparatus of claim 64 wherein said at least one first decimator is responsive to a control signal from said control unit to generate decimated signals corresponding to each of said received signals for each of said trial sample phase vectors.

66. The apparatus of claim 65 wherein said metric computer receives said decimated signals at an input from said at least one first decimator and computes said performance metrics for each of said trial sample phase vectors based on corresponding ones of said decimated signals.

67. The apparatus of claim 64 further comprising at least one second decimator to generate decimated signals corresponding to each of said received signals for each of said trial sample phase vectors.

68. The apparatus of claim 67 wherein said metric computer receives said decimated signals at an input from said at least one second decimator and computes said performance metrics for each of said trial sample phase vectors based on corresponding ones of said decimated signals.

69. The apparatus of claim 64 wherein said metric computer comprises:

at least one channel estimator to generate channel estimates corresponding to each received signal;

a combiner to generate received signal estimates corresponding to each of said received signals based on said channel estimates;

an adder to determine the impairment components for each of said received signals based on said received signal estimates;

an inverse correlation estimator to generate an inverse correlation matrix based on said impairment components associated with each of said received signals; and a processor to compute said performance metrics based on said channel estimates and said inverse correlation matrix.

70. The apparatus of claim 64 wherein said metric computer comprises:
   at least one channel estimator to generate channel estimates corresponding to each received signal;
   a data correlation estimator to generate a data correlation matrix based on said received signals; and
   a processor to compute said performance metrics based on said channel estimates and said data correlation matrix.

71. The apparatus of claim 64 wherein said control unit generates said trial sample phase vectors.

72. The apparatus of claim 64 wherein said control unit selects the trial sample phase vector that maximizes said performance metric.

73. The apparatus of claim 64 wherein said control unit selects a trial sample phase vector based on a comparison of said successive ones of said performance metrics to a threshold.

* * * * *